United States Patent
Cline (10) Patent No.: US 7,231,468 B2
(45) Date of Patent: Jun. 12, 2007

(54) FUTURE ACTIVITY LIST FOR PERIPHERAL BUS HOST CONTROLLER

(75) Inventor: Leslie E. Cline, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 10/456,185

(22) Filed: Jun. 6, 2003

(65) Prior Publication Data

US 2005/0033869 A1 Feb. 10, 2005

(51) Int. Cl.
*G06F 3/00* (2006.01)
*G06F 13/00* (2006.01)

(52) U.S. Cl. .................. 710/15; 710/313; 710/104

(58) Field of Classification Search ............... 713/301, 713/300; 710/300–315, 100–104, 8–19, 710/62–64, 72–74, 107; 711/110; 714/46
See application file for complete search history.

(56) References Cited

U.S. PATENT DOCUMENTS 5,640,504 A * 6/1997 Johnson, Jr. ................ 714/4
6,456,702 B2 * 9/2002 Nishihara ................ 379/93.05
6,590,897 B1 * 7/2003 Lauffenburger et al. . 370/395.6
6,760,852 B1 * 7/2004 Gulick ........................ 713/324
6,797,884 B2 * 9/2004 Kubota ......................... 174/66
6,816,976 B2 * 11/2004 Wright et al. ............... 713/323

* cited by examiner

*Primary Examiner*—Christopher Shin
(74) *Attorney, Agent, or Firm*—Blakely, Sokoloff, Taylor & Zafman LLP (57) ABSTRACT

One embodiment includes a future activity list (FAL) maintained within a peripheral bus host controller. The FAL includes information indicating for a number of peripheral bus frames whether those frames will have activity or are null. For frames that will have activity, the host controller performs a system memory read to gather information required to process the active frame. For frames that are null, the host controller does not perform the system memory read. A bus master status bit is pegged (continually set to "true") by the host controller only when the host controller is processing an active frame. Because the bus master status bit is not pegged by the host controller during null frames, there is greater opportunity for an operating system to enter lower power states.

27 Claims, 7 Drawing Sheets

| FAL31 | FAL[30:n+1] | FALn | FAL[n-1:3] | FAL2 | FAL1 | FAL0 |

US 7,231,468 B2

FUTURE ACTIVITY LIST FOR PERIPHERAL BUS HOST CONTROLLER

FIELD OF THE INVENTION

The present invention pertains to the field of computer systems. More particularly, this invention pertains to the field of peripheral bus controllers.

BACKGROUND OF THE INVENTION

Computer systems typically include peripheral busses that are capable of coupling a variety of peripheral devices to the system. Some of these peripheral devices may include keyboards, audio components, printers, scanners, storage devices, pointer devices, etc. One peripheral bus commonly found in today's computer systems is the Universal Serial Bus (USB).

In an effort to reduce power consumption, typical computer systems employ a combination of software and hardware techniques based on the Advanced Configuration and Power Interface Specification (ACPI), Revision 2.0b. The ACPI specification describes the structures and mechanisms necessary to design operating system-directed power management and make advanced configuration architectures possible. ACPI defines power management levels ranging from a C0 state (maximum power consumption) to a C4 state (minimum power consumption).

In prior computer systems implementing version 1.1 of USB, a USB host controller reads from the computer system's main memory every 1 ms to learn what the USB host controller must do during the next USB frame, even if it finds that it has nothing to do. For prior computer systems implementing version 2.0 of USB, the host controller reads from system memory every 125 us to learn what it must do during the next USB microframe, again even if it finds that it has nothing to do.

Microsoft® Windows® operating systems are commonly found in today's computer systems. Windows operating systems prior to the XP version keep USB host controllers always enabled whenever a USB peripheral device is attached so that the USB host controller can perform the afore-mentioned periodic reads from system memory. Windows XP keeps the host controller enabled when any USB device is attached, unless the device is in a suspended state and complies with USB device hardware and software requirements necessary for using the Windows XP "USB Selective Suspend" protocol.

Current computer systems compliant with the ACPI specification include logic devices that contain an ACPI bus master status bit (BM_STS). Prior system logic devices keep the BM_STS bit "pegged" (always returns "true" whenever the operating system reads it) while any USB host controller is enabled. Whenever the operating system attempts to enter either a C3 state or a C4 state, the operating system reads the BM_STS bit, and enters a C3 state or a C4 state if the BM_STS bit is false, but chooses to enter a C2 state if the BM_STS bit is true. Therefore, because the BM_STS is pegged when any USB device is attached, the operating system cannot enter the C3 or C4 state, and instead must enter the C2 state, which limits the amount of power savings possible.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, one embodiment includes a future activity list (FAL) maintained within a peripheral bus host controller. The FAL includes information indicating for a number of peripheral bus frames whether those frames will have activity or are null. For frames that will have activity, the host controller performs a system memory read to gather information required to process the active frame. For frames that are null, the host controller does not perform the system memory read, thereby reducing the number of system memory cycles and thus reducing system power consumption.

A BM_STS bit is pegged (continually set to "true") by the host controller only when the host controller is processing an active frame. Because the BM_STS bit is not pegged by the host controller during null frames, there is greater opportunity for an operating system to enter lower power states, such as the C3 and C4 states, which results in reduced system power consumption. The FAL is updated whenever there is a peripheral bus device driver request or upon a FAL timing window timeout.

Although the embodiments described herein refer to the ACPI specification and a BM_STS bit, other embodiments are possible using other power management schemes.

Figure 1:
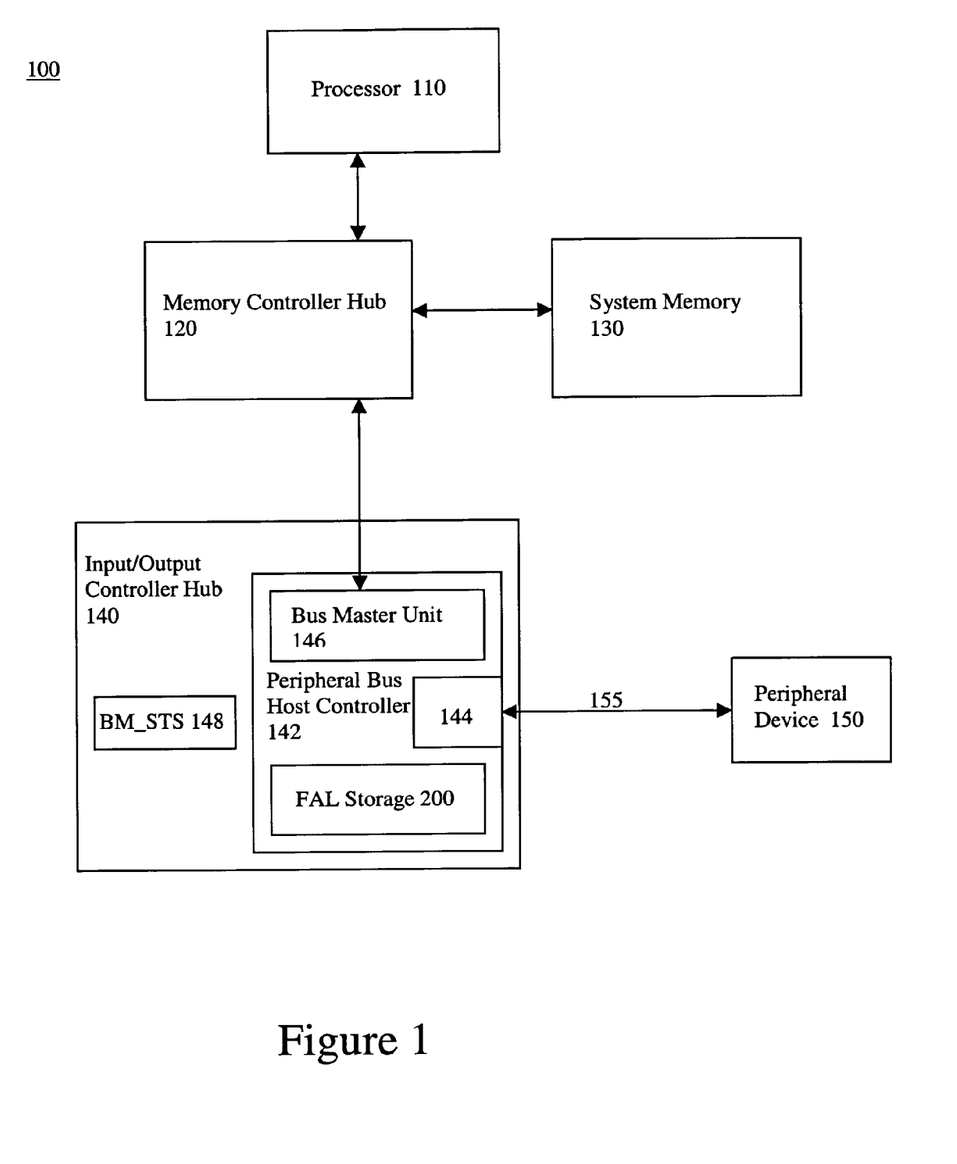
FIG. 1 is a block diagram of a computer system including an input/output controller hub that includes a peripheral bus host controller.

FIG. 1 is a block diagram of a computer system 100 including an input/output controller hub 140 that includes a peripheral bus host controller 142. The system 100 further includes a processor 110 coupled to a memory controller hub 120. The memory controller hub 120 is further coupled to a system memory 130 and the input/output controller hub 140. The input/output hub 140 includes a BM_STS bit 148.

The peripheral bus host controller 142 includes a bus master unit 146, a peripheral bus interface unit 144, and a future activity list (FAL) storage register 200. The interface 144 is coupled to a peripheral bus 155 which is further coupled to a peripheral device 150.

For this example embodiment, the peripheral bus 155 is a USB, and the peripheral bus host controller 142 is a USB host controller. Other embodiments are possible using other peripheral busses. The peripheral device 150 may be any of a broad range of peripheral devices.

The example computer system 100 is only one of many possibilities for computer system configurations. Further, although this example embodiment uses a peripheral bus host controller that is included within a larger system logic device, the host controller may be implemented as a stand-alone device.

Figure 2:
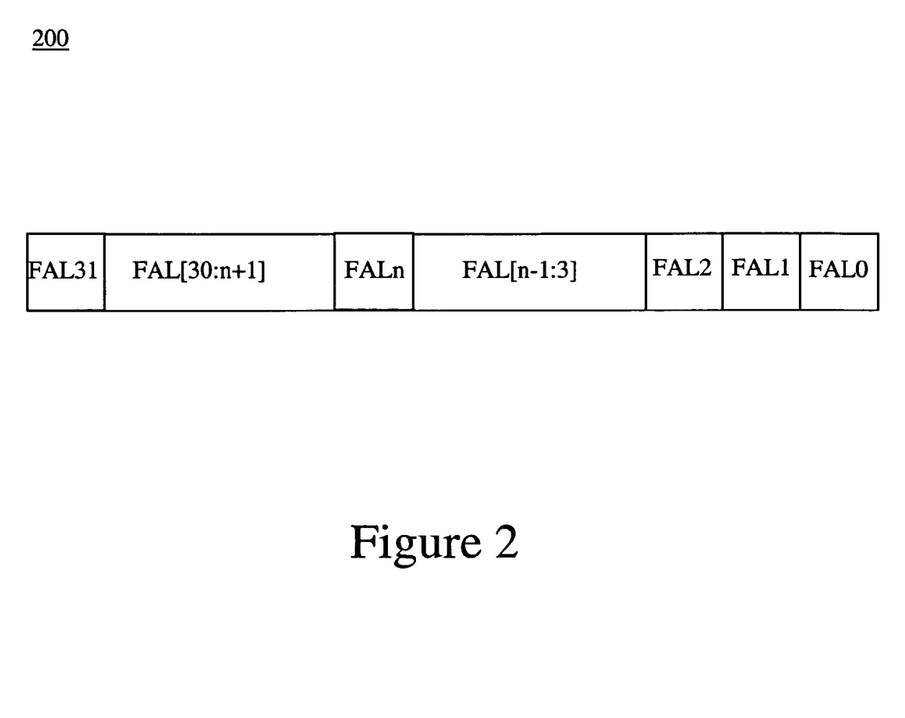
FIG. 2 is a diagram of a future activity list register.

FIG. 2 is a diagram of the FAL storage device 200. For this example embodiment, the FAL storage device 200 is a 32 bit register. Each bit in the register 200 corresponds to a single USB frame. An active frame is indicated by setting a corresponding bit to a "0", while a null frame is indicated by the value "1". Although the FAL storage area in this example is a 32 bit register, other embodiments may use other types, sizes, and formats of storage devices.

Figure 3:
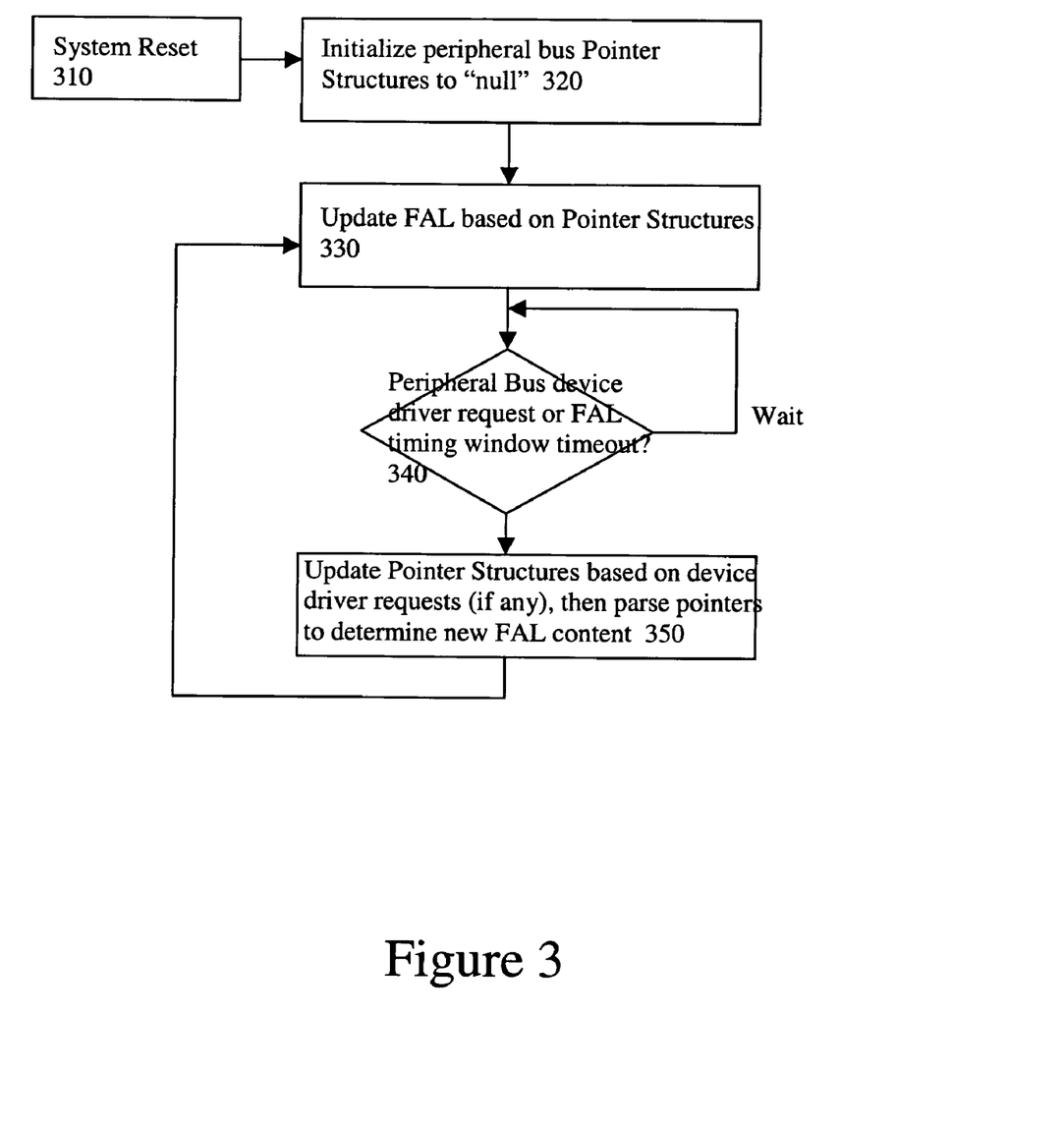
FIG. 3 is a flow diagram of a method to update future activity list data.

FIG. 3 is a flow diagram of a method to update FAL data within the FAL storage 200. Block 310 indicates a system reset. This may occur upon system power-up. At block 320, peripheral bus pointer structures stored in system memory 130 are initialized to null. The FAL is updated based on the pointer structures at block 330. Because the pointer structures have been initialized to null, the FAL will indicate nothing but null frames. As indicated by decision block 340, the FAL will remain as is until there is a peripheral bus device driver request to update the pointer in system memory or until the FAL timing window times out (all or nearly all of the data in the FAL is stale and data must be obtained for a next batch of frames).

Block 350 indicates that the pointer structures in system memory are updated based on a device driver request. The pointers are then parsed in order to determine new FAL content. Processing returns to block 330 where the FAL is updated with the new information based on the revised pointer structures.

The process described above in connection with FIG. 3 may be accomplished via software, under operating system control.

Figure 4:
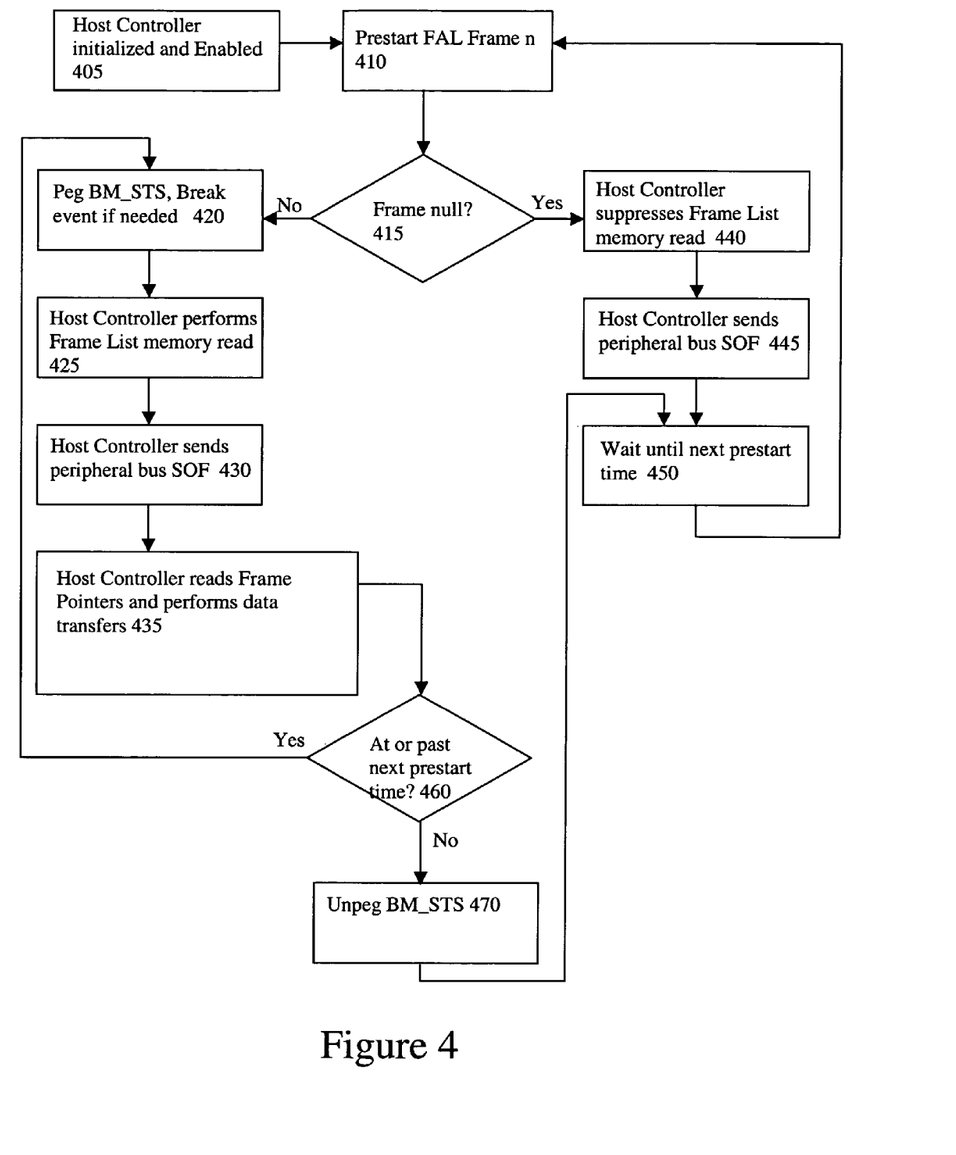
FIG. 4 is a flow diagram describing BM_STS bit management and peripheral bus host controller reads to system memory.

FIG. 4 is a flow diagram describing BM_STS bit 148 management and peripheral bus host controller 142 reads to system memory 130. At block 405, the host controller 142 is initialized and enabled. This may occur when the peripheral device host controller first detects the presence of a peripheral device, possibly at system start-up. Block 410 indicates prestart FAL processing for frame n, in this the first frame. The term "prestart" as used herein is meant to denote processing that occurs for a particular frame with regard to the FAL 200 before the frame time begins on the peripheral bus 155.

At block 415, a determination is made as to whether the current frame is null. If the current frame is not null, then at block 420 the BM_STS bit 148 is pegged. A break event also occurs, if needed. A break event causes the computer system 100 to exit either the C4 or C3 ACPI state. Possible break events are interrupt requests and bus master requests. For this example embodiment, the computer system needs to be in either state C0, C1, or C2 in order for the host controller 142 to generate system memory read cycles.

At block 425, the host controller 142 performs a frame list memory read from system memory 130 via the bus master unit 146. The host controller 142 then sends a start of frame (SOF) message over the peripheral bus 155 at block 430. At block 435, the host controller 142 reads from system memory 130 the pointer structure associated with the current frame, and performs the data transfers associated with the current frame. The BM_STS bit is then unpegged by the host controller 142. It is possible that the BM_STS bit 148 may remain set if required by another system device.

Following the data transfer at block 435, a decision is made at block 460. If the data transfers at block 435 ended before the next prestart time (frame was short-active), the host controller 142 unpegs the BM_STS bit 148, then waits until the next prestart time, as indicated by block 450. Processing then returns to block 410. However, if the data transfers at block 435 ended at or after the next prestart time (frame was long-active), processing moves to block 420.

Upon the prestart time for the next frame, a determination is made at block 415 as to whether this next frame is null. If the frame is null, then, as indicated by block 440, the host controller internally suppresses the frame list memory read. That is, the host controller does not perform a read to system memory. There is no need to read from system memory, because the information in the FAL associated with this frame indicates that the frame is null and no data will be transferred on the peripheral bus 155 during this frame. Also, because the host controller 142 has not pegged the BM_STS bit 148, unless another system device has set the BM_STS bit 148, the computer system can enter or remain in the C3 or C4 states.

At block 445, the host controller 142 delivers a SOF message over the peripheral bus 155 and then waits for the next prestart time at block 450.

Figure 5:
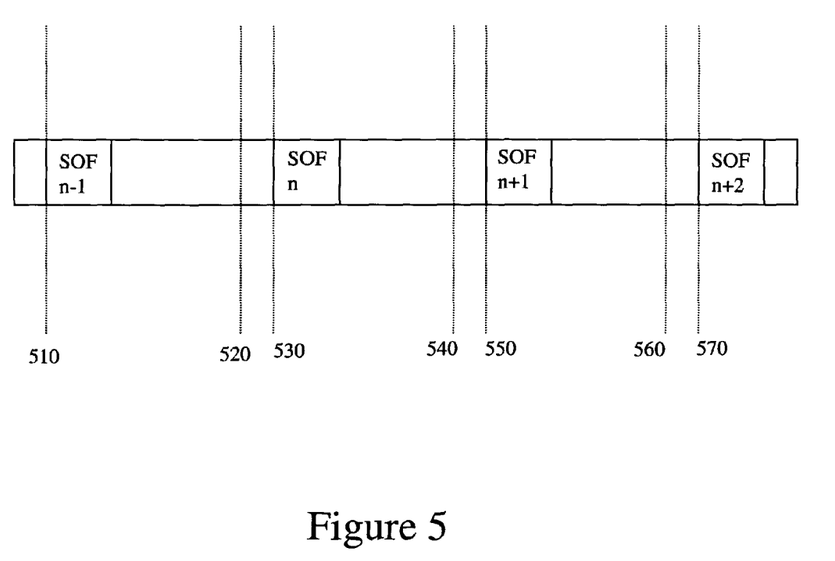
FIG. 5 is a timing diagram showing continuous null frames.
Figure 6:
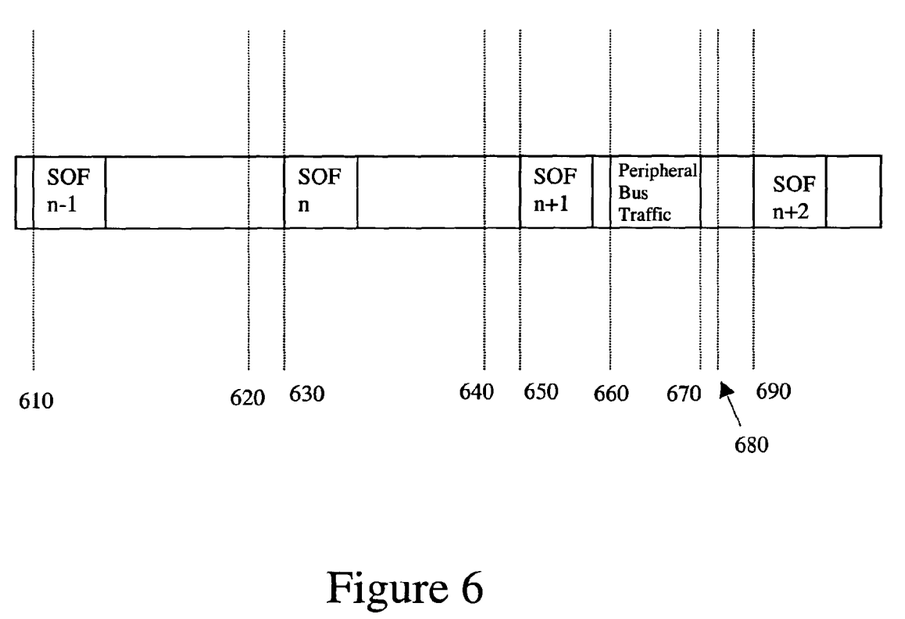
FIG. 6 is a timing diagram showing a sequence including a short-active frame.
Figure 7:
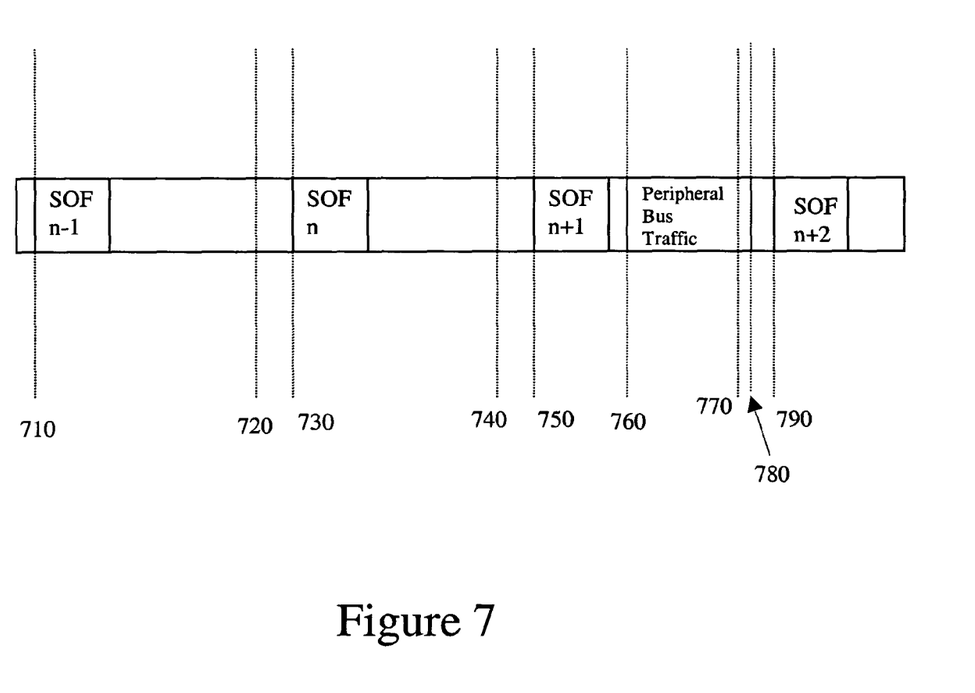
FIG. 7 is a timing diagram showing a sequence including a long-active frame.

FIGS. 5 through 7 show a few different cases that may occur during peripheral bus operation. For these discussions, the peripheral bus is assumed to be a USB version 1.1, with a frame time of 1 ms. Other embodiments are possible with other peripheral bus types and other frame times. One embodiment may use a USB version 2 with a microframe time of 125 us, with either one FAL control bit for each 1 ms frame, or with one FAL control bit for each 125 us microframe.

FIG. 5 is a timing diagram showing continuous null frames. The host controller 142 issues a SOF message every 1 ms, starting at time 510 for frame n−1. The prestart time for frame n occurs at time 520. Time 520 may occur 150-200 us prior to SOF time 530 for frame n. Other prestart times are possible. At time 520, the FAL 200 is analyzed to determine whether frame n is null. Because in this case frame n is null, the host controller 142 suppresses the frame list memory read from system memory. The BM_STS bit 148 is not pegged, so the system can enter or remain in ACPI state C3 or C4. At time 530, the SOF for frame n is issued by the host controller 142.

The prestart time for frame n+1 occurs at point 540. At time 540, the FAL 200 is analyzed to determine whether frame n+1 is null. Because in this case frame n+1 is null, the host controller 142 suppresses the frame list memory read from system memory. The BM_STS bit 148 is not pegged, so the system can enter or remain in ACPI state C3 or C4. At time 550, the SOF for frame n+1 is issued by the host controller 142.

The prestart time for frame n+2 occurs at point 560. At time 560, the FAL 200 is analyzed to determine whether frame n+2 is null. Because in this case frame n+2 is null, the host controller 142 suppresses the frame list memory read from system memory. The BM_STS bit 148 is not pegged, so the system can enter or remain in ACPI state C3 or C4. At time 570, the SOF for frame n+2 is issued by the host controller 142.

FIG. 6 is a timing diagram showing a sequence including a short-active frame. The host controller 142 issues a SOF message every 1 ms, starting at time 610 for frame n−1. The prestart time for frame n occurs at time 620. Time 620 may occur 150-200 us prior to SOF time 630 for frame n. Other prestart times are possible. At time 620, the FAL 200 is analyzed to determine whether frame n is null. Because in this case frame n is null, the host controller 142 suppresses the frame list memory read from system memory. The BM_STS bit 148 is not pegged, so the system can enter or remain in ACPI state C3 or C4. At time 630, the SOF for frame n is issued by the host controller 142.

The prestart time for frame n+1 occurs at point 640. At time 640, the FAL 200 is analyzed to determine whether frame n+1 is null. Because in this case frame n+1 is active, the host controller 142 pegs the BM_STS bit 148 so that the system can exit or avoid states C3 and C4. The host controller 142 performs the frame list fetch from system memory 130. At time 650, the SOF for frame n+1 is issued by the host controller 142. At time 660, the host controller 142 begins to read from system memory 130 the pointer structure associated with frame n+1, and service the USB traffic of frame n+1. When the transfer of data completes at time 670 and after the pointers have been updated in the system memory, the BM_STS bit 148 is unpegged because the USB traffic ended before the prestart time for frame n+2.

The prestart time for frame n+2 occurs at point 680. At time 680, the FAL 200 is analyzed to determine whether frame n+2 is null. Because in this case frame n+2 is null, the host controller 142 suppresses the frame list memory read from system memory. The BM_STS bit 148 is not pegged, so the system can enter or remain in ACPI state C3 or C4. At time 690, the SOF for frame n+2 is issued by the host controller 142.

FIG. 7 is a timing diagram showing a sequence including a long-active frame. The host controller 142 issues a SOF message every 1 ms, starting at time 710 for frame n−1. The prestart time for frame n occurs at time 720. Time 720 may occur 150-200 us prior to SOF time 730 for frame n. Other prestart times are possible. At time 720, the FAL 200 is analyzed to determine whether frame n is null. Because in this case frame n is null, the host controller 142 suppresses the frame list memory read from system memory. The BM_STS bit 148 is not pegged, so the system can enter or remain in ACPI state C3 or C4. At time 730, the SOF for frame n is issued by the host controller 142.

The prestart time for frame n+1 occurs at point 740. At time 740, the FAL 200 is analyzed to determine whether frame n+1 is null. Because in this case frame n+1 is active, the host controller 142 pegs the BM_STS bit 148 so that the system can exit or avoid states C3 and C4. The host controller 142 performs the frame list fetch from system memory 130. At time 750, the SOF for frame n+1 is issued by the host controller 142. At time 760, the host controller 142 begins to read from system memory 130 the pointer structure associated with frame n+1, and service the USB traffic of frame n+1. In this case the USB traffic continues until time 780 which is after the prestart time 770 for frame n+2. At time 770, the FAL is analyzed and it is found that for this case frame n+2 is null. However, because frame n+1 is long-active (full or nearly full), and there is still USB traffic at the prestart time 770, an assumption is made that frame n+2 will also be active, even if marked null in the FAL. Therefore, the read to system memory 130 is not suppressed and frame n+2 is handled as an active frame. This is to ensure that the BM_STS bit remains true, and therefore operating system C3 and C4 entry is prevented during the USB traffic that follows the FAL analysis point 770.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
a peripheral bus interface to communicate a plurality of frames over a peripheral bus;
a future activity list storage area to store information indicating which, if any, of the plurality of frames are null; and
a controller, responsive to the information in the future activity list storage area, to read from a memory an action the controller is to take during a non-null future frame.

2. The apparatus of claim 1, the future activity list storage area to store information indicating which, if any, of the plurality of frames are null on a frame by frame basis.

3. The apparatus of claim 2, the peripheral bus interface to communicate the plurality of frames over a universal serial bus.

4. A method, comprising:
initializing data pointer structures for a peripheral bus to null;
updating the data point structures based on a peripheral bus device driver request; and
updating a future activity list based on the updated data pointer structures to indicate to a controller an activity the controller is to take in a future frame.

5. The method of claim 4, further comprising parsing the pointers to determine new future activity list content.

6. The method of claim 5, further comprising updating the future activity list with the new future activity list content.

7. A machine-readable medium having stored thereon instructions which, when executed by a computer system, causes the computer system to perform a method comprising:
initializing data pointer structures for a peripheral bus to null;
updating the data point structures based on a peripheral bus device driver request; and
updating a future activity list based on the updated data pointer structures to indicate to a controller an activity the controller is to take in a future frame.

8. The machine-readable medium of claim 7, further comprising parsing the pointers to determine new future activity list content.

9. The machine-readable medium of claim 8, further comprising updating the future activity list with the new future activity list content.

10. An apparatus, comprising:
a bus master unit;
a bus master status register;
a peripheral bus interface to communicate a plurality of frames over a peripheral bus;
a future activity list storage area to store information indicating which, if any, of the plurality of frames are null; and
a controller, responsive to the information in the future activity list storage area, to read from a memory an action the controller is to take during a non-null future frame.

11. The apparatus of claim 10, the future activity list storage area to store information indicating which, if any, of the plurality of frames are null on a frame by frame basis.

12. The apparatus of claim 11, the peripheral bus interface to communicate the plurality of frames over a universal serial bus.

13. The apparatus of claim 12, the bus master status register to be set if a next frame is not null, as indicated by the information stored in the future activity storage area.

14. The apparatus of claim 13, the bus master unit to retrieve information relating to a data transfer to be accomplished during the next frame period.

15. The apparatus of claim 14, the peripheral bus interface to communicate a start of frame over the peripheral bus.

16. The apparatus of claim 15, the peripheral bus interface performing a data transfer during the next frame period according to the information retrieved by the bus master unit.

17. The apparatus of claim 16, the bus master status bit to be cleared following the data transfer.

18. The apparatus of claim 17, the bus master unit to not retrieve information relating to a data transfer to be accomplished during the next frame period if the information future activity storage area indicates that the next frame is null.

19. A system, comprising:
a processor;
a system memory coupled to the processor; and
a system logic device coupled to the system memory, the system logic device including
a bus master unit,
a bus master status register,
a peripheral bus interface to communicate a plurality of frames over a peripheral bus;
a future activity list storage area to store information indicating which, if any, of the plurality of frames are null; and
a controller, responsive to the information in the future activity list storage area, to read from a memory an action the controller is to take during a non-null future frame.

20. The system of claim 19, the future activity list storage area to store information indicating which, if any, of the plurality of frames are null on a frame by frame basis.

21. The system of claim 20, the peripheral bus interface to communicate the plurality of frames over a universal serial bus.

22. The system of claim 21, the bus master status register to be set if a next frame is not null, as indicated by the information stored in the future activity storage area.

23. The system of claim 22, the bus master unit to retrieve information from the system memory, the information relating to a data transfer to be accomplished during the next frame period.

24. The system of claim 23, the peripheral bus interface to communicate a start of frame over the peripheral bus.

25. The system of claim 24, the peripheral bus interface performing a data transfer during the next frame period according to the information retrieved by the bus master unit from the system memory.

26. The system of claim 25, the bus master status bit to be cleared following the data transfer.

27. The system of claim 26, the bus master unit to not retrieve information relating to a data transfer to be accomplished during the next frame period if the information future activity storage area indicates that the next frame is null.

* * * * *